Patented Apr. 9, 1946

2,397,945

UNITED STATES PATENT OFFICE 2,397,945

POLYMERIZATION OF PROPYLENE

Donald E. Burney, Hammond, Ind., and Edmond L. d'Ouville and Carl Max Hull, Chicago, Ill., assignors to Standard Oil Company, Chicago, Ill., a corporation of Indiana Application November 20, 1942, Serial No. 466,286

3 Claims. (Cl. 260—683.15)

This invention relates to the polymerization of olefins and particularly to the polymerization of propylene to produce lubricating oils and other polymers of relatively high molecular weight.

One object of the invention is to effect the polymerization of propylene and propylene-containing gases by the action of a fluid aluminum chloride catalyst in a manner whereby the polymerization into lubricating oils and other heavy products is more complete than has heretofore been commercially practicable. A most important object is to obtain a larger yield of oil for a given amount of catalyst or, stated another way, an increased catalyst life.

A further object is to provide a novel reaction vessel and technique by which this long catalyst life can be accomplished. Still another object is to produce, by means of the high space velocities employed, a large amount of polymer with a minimum of plant equipment. Another object of the invention is to obtain from propylene polymerization products of more uniform molecular weight. Still another object of the invention is to produce oils from propylene in a continuous polymerization operation without difficulty from reaction temperature control, reaction contact time, or other difficulties commonly encountered in olefin polymerization. As a result of our process improvements and simplifications, it is possible to produce desirable lubricating oils from propylene in commercial quantities at a cost which makes these oils competitive with natural lubricating oils.

Figure 1:
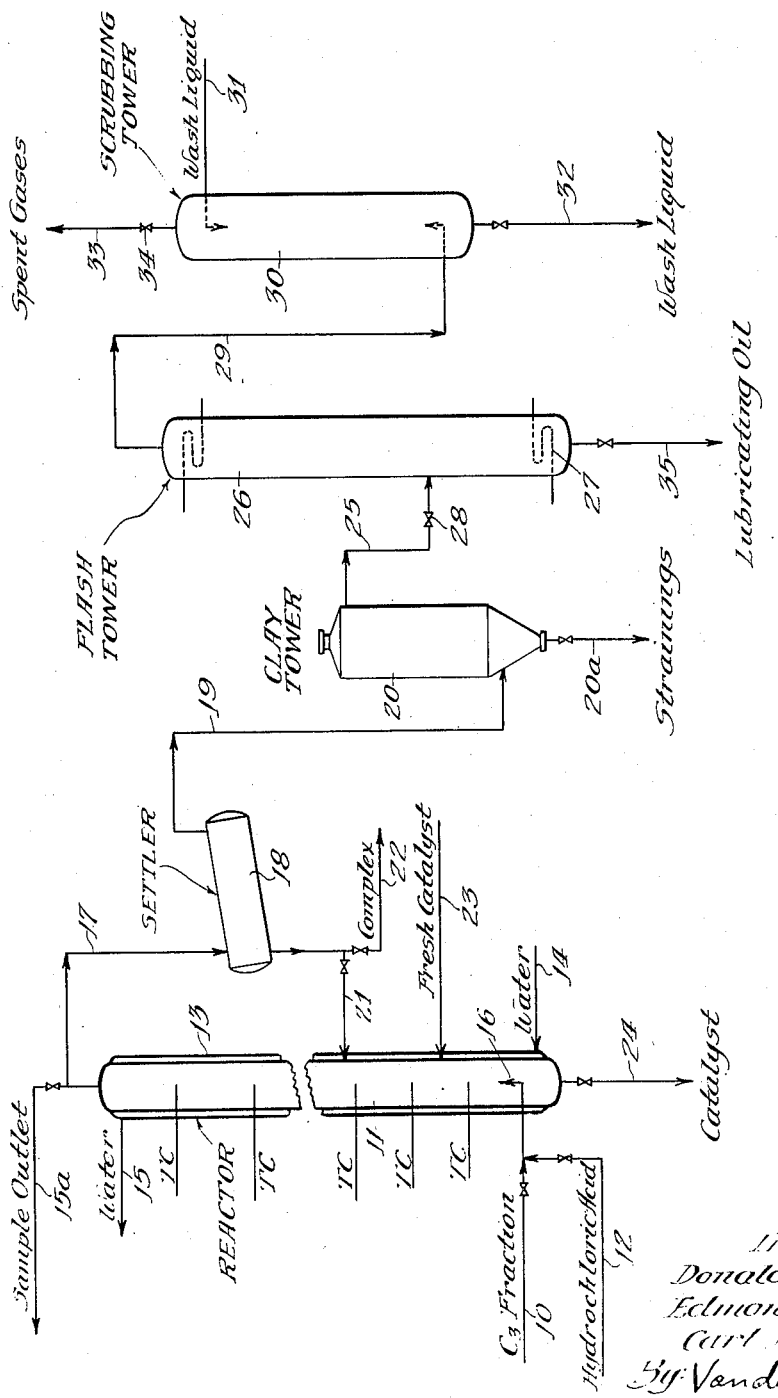
Figure 2:
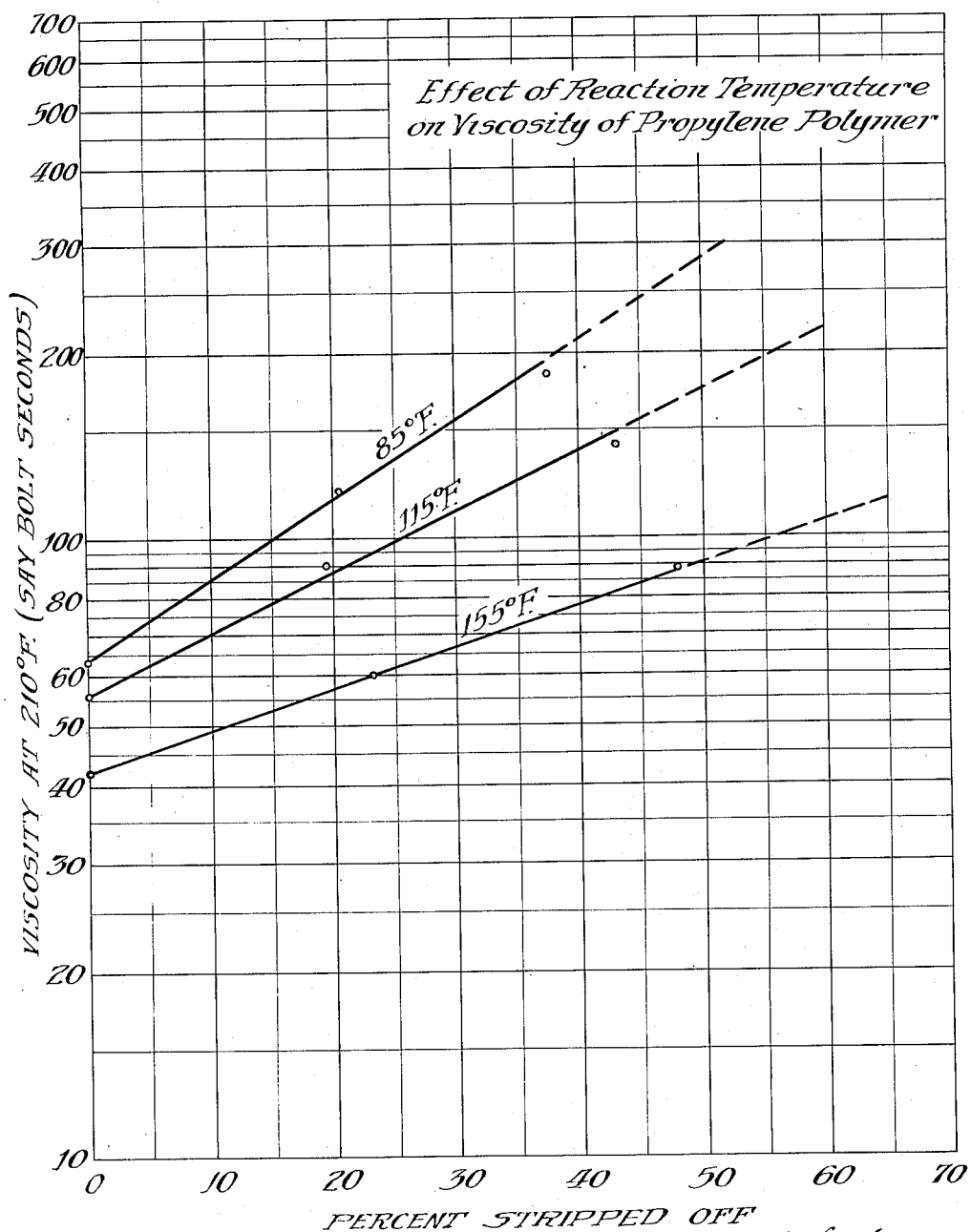
Figure 3:
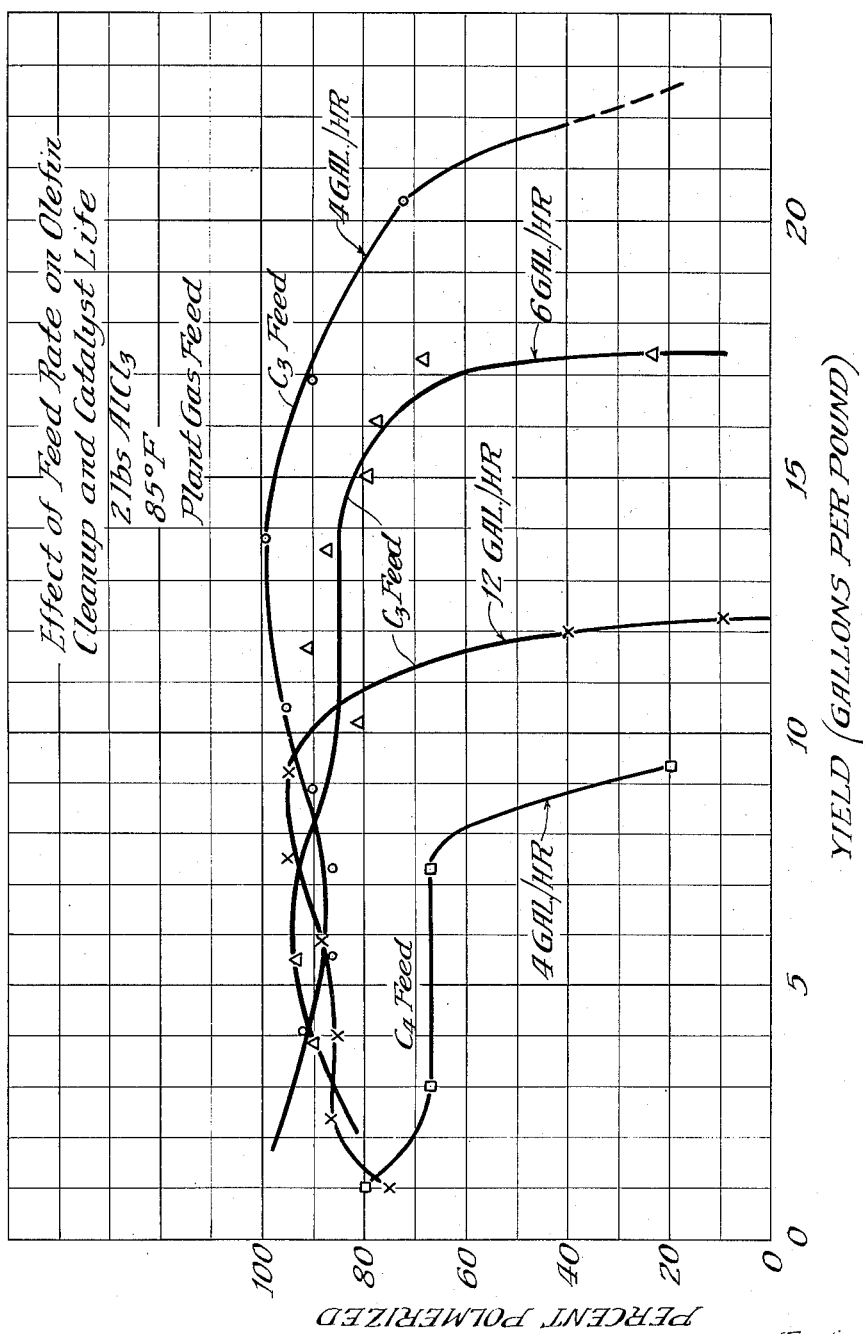

This specification is accompanied by drawings in which Figure 1 shows schematically an arrangement of apparatus for carrying out the process, Figure 2 is a graph of viscosity data and Figure 3 is a graph of yield data.

In the polymerization of olefin gases, and particularly propylene, considerable difficulty has heretofore been encountered in controlling the reaction conditions to produce the product desired. One of the catalysts commonly employed for this process is aluminum chloride which has been used in various ways, for example, by adding in granular form directly to liquid propylene with agitation. Propylene gas has also been conducted through a bed of aluminum chloride in granular form or deposited on various carriers. The aluminum chloride has also been dissolved or associated with various solvents before contacting with the propylene. When solid AlCl₃ was used according to the prior art, it became converted to a liquid AlCl₃-hydrocarbon complex which was generally lost from the process. By our novel operating technique, the polymerizing activity of the AlCl₃ is substantially exhausted. Thus we have been able to obtain unprecedented yields of polymer per pound of AlCl₃. For example, we are able to obtain about twenty gallons of polymer per pound of AlCl₃ (5 lbs. AlCl₃ per 100 gal.) using a feed rate of four gallons per hour per pound of AlCl₃, whereas prior art processes yielded only about 1 to 4 gallons per pound at much lower feed rates.

In the past much difficulty has been encountered in controlling reaction temperature which is exothermic to a high degree. With increase in temperature the products have tended to fall in molecular weight so that gasoline is sometimes produced to a considerable extent instead of lubricating oils. Local overheating in different parts of the catalyst tends to produce light products while other parts of the catalyst may be producing heavy products and the result is a mixture of polymers of the desired high molecular weight along with undesirably low molecular weight naphthas. As a result, the yield of lubricating oil from propylene has been disappointingly low. Various attempts have been made to overcome these difficulties. The activity of the catalyst has been modified by combining aluminum chloride with other inorganic salts. Inert solvents and chlorinated solvents have been employed to assist in controlling the reaction. Various involved mixing and cooling methods have been tried with only partial success. Temperature control has been sought through self-refrigeration by incorporating in the reaction mixture a solvent boiling at the desired reaction temperature. These methods of reaction control have generally led to an increase in the cost of carrying out the process sufficient to prevent its commercial adoption.

Our process provides a method for the polymerization of propylene which is efficient and economical, and which converts propylene almost entirely into products within the lubricating oil range. The method consists essentially in employing a fluid AlCl₃ catalyst comprising an aluminum chloride-hydrocarbon dispersion or complex in a deep column through which liquid propylene or a liquefied gas fraction containing propylene is injected. It is preferred to employ an inert diluent with the propylene. As the propylene passes upwardly through the column of fluid AlCl₃ catalyst, polymerization occurs rapidly and continuously without interruption until the polymer solution escapes from the catalyst layer at the top of the column. Cooling is preferably supplied by a cooling jacket surrounding the column and/or by indirect cooling coils immersed in the column of catalyst complex. Where a cooling jacket is depended on, the diameter of the column should be kept below about 6 inches to provide sufficient cooling surface and a column diameter of 2 to 4 inches is preferred. No agitation is required other than that provided by the liquefied hydrocarbon gases flowing upwardly through the column. If desired the feed may be precooled as a supplemental means of temperature control.

Because of the subdivision of liquefied gases and catalyst and the large heat capacity and mobility of the catalyst, local overheating is substantially avoided. Operating in this manner it is easily practicable to obtain almost 100% polymerization of the propylene in a single pass through the reactor. Conversions of 95 to 99% of the propylene introduced into the column are readily obtained. The products collect above the surface of the catalyst complex and are continuously drawn off. The catalyst activity may be restored or enhanced by introducing hydrochloric acid gas continuously or periodically. The polymerization products may be readily refined by filtering through fuller's earth, spent filter clay, sand, glass wool, or similar porous material, producing an excellent yield of substantially colorless lubricating oil. The viscosity and molecular weight range of the lubricating oil produced may be varied somewhat by varying the temperature of the reactor, but it is characteristic of our process that the effect of temperature is much less than in the processes of the prior art.

Referring to the drawings, Figure 1, a $C_3$ fraction obtained from cracking still gases is introduced by line 10 to reactor 11, sufficient pressure being maintained to keep the hydrocarbon gases in the liquid state. A suitable pressure is about 200 pounds per square inch. Hydrochloric acid gas may be introduced as desired by line 12. The reactor 11 is provided with a water jacket 13 supplied by cooling water through connections 14 and 15. A sampling outlet 15a is provided at the outlet of the reactor. Thermocouples TC are installed at various levels.

We may use two methods of operation in starting up. By one method reactor 11 is filled to the height desired, for example one-tenth to one-half full of powdered aluminum chloride catalyst dispersed in oil after which liquefied gases are introduced by inlet 16 as described below. However, we prefer to first introduce the liquefied gas by inlet 16 and gradually introduce catalyst to the tower containing the liquefied gas until the height to which the catalyst dispersion rises at a given hydrocarbon feed rate is about 5 to 15 feet.

The fluid $AlCl_3$ catalyst may be prepared in various ways but best results have been obtained from a catalyst made by mixing powdered aluminum chloride and an olefin polymer. We prefer to employ a propylene polymer and the polymer prepared in accordance with our invention is especially suitable. In preparing the catalyst, various proportions of aluminum chloride and hydrocarbon polymer may be used but, in general, about equal weights of aluminum chloride and hydrocarbon polymer are satisfactory. In one example, 27 parts of aluminum chloride were mixed with 22 parts of propylene polymer. Some heat was evolved on mixing with the formation of a certain amount of complex which tended to stabilize the slurry. A $C_3$ liquid stream containing about 22 per cent of propylene, the rest largely propane, was passed through 4.9 pounds of this mixture at an average rate of 6.5 gallons per hour, HCl gas being added as a promoter. A yield of lubricating oil of 18.8 gallons per pound of aluminum chloride employed in the catalyst was obtained while the average clean-up of propylene was above 90%. The amount of HCl required was very small, i. e. about .005 pound per gallon of polymer produced.

Returning to the drawings, Figure 1, the liquefied gases are introduced in the base of the reactor 11 by inlet 16 near the bottom of the reactor so that the flow of liquid feed will aid in preventing settling out of suspended $AlCl_3$ from the catalyst. Owing to the large difference in density between the liquefied gas feed and the fluid aluminum chloride catalyst, the particles of liquefied gases rise through the catalyst layer at a fairly rapid rate and the propylene in the liquefied gas is substantially polymerized when the surface of the catalyst is reached. There is some indication that the catalyst complex exists in the reactor as a dispersion in the liquid hydrocarbon which forms the continuous phase. Actual time of contact, therefore, cannot be readily determined.

It is desirable to employ a relative mass velocity within the range of about 8 to 200 pounds of feed corresponding to about 2 to 50 pounds of propylene per hour per pound of $AlCl_3$ with a typical cracking still $C_3$ gas fraction. It has also been found desirable to operate within a temperature range of about 30 to 200° F., excellent yields of lubricating oils being obtained at a temperature of about 70-155° F. The effect of temperature is shown graphically in Figure 2. A higher relative mass velocity may be employed when operating at higher temperatures. The relative mass velocity to be employed in the reactor, assuming adequate cooling, is limited by the amount of catalyst carry over that can be tolerated. For a given amount of cooling surface the temperature of operation is a function of the feed rate, being high for high feed rate and low for low feed rate. Within the limits of operation the per cent conversion to polymer is very little affected by the feed rate. The relative mass velocity is the weight of hydrocarbon feed per hour per unit weight of catalyst in the reaction zone.

In the upper part of reactor 11 sufficient space is provided for settling the catalyst complex from the reaction products. Thus the polymerization of propylene and separation of catalyst from the reaction products is effected in the same reactor simultaneously and continuously and only a portion of the catalyst is carried over to the settler or withdrawn from the tower near the "top" of the catalyst phase. The catalyst normally carried over is in general of lower density, contains more combined hydrocarbon, and is of a lower order of activity. The reaction products dissolved in inert hydrocarbons, generally propane, flow by line 17 to settler 18 and thence by line 19 to clay tower 20. Catalyst complex carried over with the products from the reactor 11 is collected in settler 18 and discarded by valved line 22. In case of accidental carry-over of active catalyst into settler 18, said catalyst is returned to the reactor by line 21. Fresh catalyst is introduced to the reactor by line 23. Spent catalyst, if desired, may be withdrawn directly from the reactor by line 24.

In our continuous process we may introduce catalyst continuously as described above or intermittently in small amounts. Alternatively we may completely exhaust the catalyst, withdraw it through line 24 and replace it with fresh catalyst through line 23. This latter type of operation is feasible since the activity of the catalyst decreases sharply as indicated by a sudden drop in olefin conversion illustrated in Figure 3 and discussed hereinafter.

The chamber 20 may be charged with a filtering medium such as a burnt spent filter clay through which the reaction products are passed to remove the last traces of catalyst therefrom. Catalyst complex strained from the oil may be drawn off by line 20a. Filter yields of 800 to 2000 gallons of oil per ton of clay are obtainable. The filtered products are then conducted by line 25 to flash tower or fractionator 26. Where the recovery of diluent gases in liquid form is desirable the tower 26 may be operated as a fractionator under substantial pressure, heat being supplied by coil 27 to drive the diluents from the lubricating oil products. The base of tower 27 may thus be held at 300° F. when operating at atmospheric or slightly higher pressure. When operated as a flash tower the pressure may be reduced by valve 28 and the gases evolved in 26 may be conducted by line 29 to scrubbing tower 30 wherein hydrochloric acid gas remaining in the gases is eliminated by washing with water or dilute alkali solution introduced by line 31 and withdrawn by line 32. Spent diluent gases are discharged by line 33, controlled by valve 34 adjusted to maintain the desired pressure on the flash tower and scrubber 26 and 30 respectively. A lubricating oil product is withdrawn from the base of tower 26 by line 35. It may be further fractionated, if desired, to produce light, intermediate and heavy fractions of lubricating oil. These fractions may be blended to give an oil having any viscosity and/or flash desired. Because of the excellent color of the oil and freedom from impurities, wax, etc., no washing or other refining is necessary.

In another example of our process, the catalyst employed was a fluid aluminum chloride catalyst comprising a complex prepared by the action of $AlCl_3$ on technical isooctane and fortified by the addition of anhydrous aluminum chloride. The operation was conducted in a plant such as that illustrated in Figure 1. One gallon of the catalyst was placed in the reactor, which was made from a pipe of two inches internal diameter and thirteen feet high provided with an external water-jacket for cooling. Eighty inches of reactor height had a volume of about one gallon; thus, the catalyst formed a column about seven feet in depth. In general, we have found that a catalyst suspension of about three to fifteen feet in depth is satisfactory.

Into the base of the column there was then injected a liquid $C_3$ hydrocarbon fraction containing about 20 to 25 per cent of propylene. The feed rate was maintained at about 4.4 gallons per hour at a pressure of about 200 pounds per square inch. An analysis of the products showed that at the beginning of the run the propylene was polymerized to the extent of 98 per cent and after 8½ hours the clean-up was 97 per cent. A carryover of 17% of the catalyst occurred early in the experiment indicating that too much catalyst had been charged to the reactor. The temperature of the catalyst varied from about 55 to 85° F., the maximum temperature being reached after about one hour operation, after which the temperature gradually dropped to about 60° F.

Continuing the experiment, the following data were obtained: A liquid $C_3$ fraction of the same composition as above was charged at the same rate, i. e. 4.4 gallons per hour. About 10 pounds of aluminum chloride were present as a fluid catalyst. When the total feed charged had reached 61 gallons (258 pounds), there had been produced 48 pounds (6.8 gallons) of polymer, an overall yield of 18.4 per cent by weight or 11.1 per cent by volume based on the $C_3$ feed charged or 84% based on the propylene contained in the feed. During the first half of the run the cleanup of propylene averaged 95% or higher. After 41 pounds of polymer had been produced, the conversion had dropped to 83% and at the end of the period it had reached 70%.

The following results obtained on continuation of the experiment show the effect of hydrochloric acid gas as an activator in the polymerization of propylene with aluminum chloride-hydrocarbon complex. The $C_3$ fraction was charged at the rate of two gallons per hour for a period of three hours. At this time analyses of the off gas showed that the olefin clean-up had decreased to 55% despite the lower feed rate. HCl diluted with methane was then added continuously at the rate of .0008 pound HCl per hour without interrupting the feed. The catalyst activity improved immediately and after three hours the olefin cleanup had reached 73%. Addition of HCl was continued for about nine hours at which time the olefin clean-up reached 95%. The feed rate was then increased to 4.8 gallons per hour and the rate of adding HCl to .00175 pound per hour. Under these conditions the olefin clean-up remained at 81 to 85 per cent. Later the rate of adding HCl was increased to .0032 pound per hour, with the same high feed rate, and the clean-up increased to 99 per cent.

In order to illustrate the continuous operation of our process with intermittent additions of fresh fluid aluminum chloride catalyst, we cite this additional example: The fluid catalyst, which contained an equivalent of 2.2 pounds of aluminum chloride and was prepared by mixing approximately equal weights of powdered technical aluminum chloride and propylene polymer (at which time partial conversion to aluminum chloride-hydrocarbon complex occurred), was charged to the same reactor as referred to hereinabove. The pressure in the reactor during the run was maintained at about 200 pounds per square inch and the temperature generally remained between 70 and 80° F. The feed (comprising 20 to 25% propylene and the remainder substantially propane), to which had been added .0007 pound of hydrogen chloride per gallon, was charged to the reactor at an average rate of about 4.5 gallons per hour. The average conversion of olefins to polymer remained above 90% until a yield of 17.5 gallons of polymer per pound of aluminum chloride had been produced. The conversion then dropped rapidly to 72% at a yield of 20 gallons per pound. Without removing the catalyst from the reactor, a fluid catalyst charge containing an equivalent of 2.2 pounds of aluminum chloride was injected into the reactor near the bottom and the polymerization continued. The conversion of the propylene rapidly increased to 90% and above. When the yield of polymer reached 13 gallons of polymer per pound of added aluminum chloride the conversion was 90%, but then fell to 59% by the time that 16 gallons per pound were obtained. Up to that time 6.4 pounds of relatively inactive catalyst complex (representing about 2.5 pounds of aluminum chloride) had been removed from the settler. Again 2.2 pounds of aluminum chloride, in the form of the fluid catalyst described above, was injected near the bottom of the reactor. The conversion increased to its original value as the polymerization was continued. When the conversion again decreased below 90%, 3.8 pounds of catalyst complex (equivalent to 1 to 1.5 pounds of aluminum chloride) were withdrawn from the settler before another addition of catalyst was made. These repeated semi-continuous additions of fresh catalyst with continuous elimination of relatively inactive catalyst from the reactor were continued until a total of 150 gallons of polymer had been prepared over a period of about 240 hours of on-stream operation, representing an overall yield of 17.2 gallons per unit of catalyst equivalent to one pound of aluminum chloride. A polymer yield of 22.5% by weight based on total $C_3$ hydrocarbon charged indicated that the overall propylene (20 to 25% of feed) conversion was above 90%.

It will be apparent from our examples that large amounts of oil can be produced in relatively small sized equipment. Thus, we have produced yields of oil varying from about one-half to two gallons of polymer per hour in a reaction zone having a volume of about 2 gallons.

After allowing propane to evaporate from the polymer product obtained in these operations, the product was heated to 500° F. to remove any light products of which only 2 per cent was removed. The oil obtained gave the following inspection:

| | |
|---|---|
| Gravity | °A. P. I. 35.6 |
| Flash | °F. 285 |
| Pour point | °F. −10 |
| Viscosity, Saybolt Universal at 100° | 1359 |
| Viscosity, Saybolt Universal at 210° | 84.8 |
| Viscosity index | 50 |
| Acidity | mg. KOH/gm. .06 |
| Carbon residue—ASTM | per cent .01 |
| Chlorine | per cent less than .01 |

By blending in two different base oils, one a solvent refined Mid-Continent lubricating oil and the other a refined lubricating oil from Winkler County, Texas, crude, we obtained blends having the following properties:

| | M-C lubricating stock | | Winkler lubricating stock | |
|---|---|---|---|---|
| | Alone | Blend with 50% propylene polymer | Alone | Blend with 50% propylene polymer |
| Viscosity at 100° F. Saybolt seconds | 138 | 984 | 228 | 1,666 |
| Viscosity at 210° F. Saybolt seconds | 42.1 | 79.8 | 45 | 93 |
| Viscosity index | 96 | 77 | 43 | 49 |
| Viscosity index of polymer (calculated from blends) | | 58 | | 55 |

The product from another run was stripped of 12% of lightest material and the remaining oil gave the following inspection:

| | |
|---|---|
| A. P. I. | 34.3 |
| Flash | °F. 370 |
| Pour point | °F. +5 |
| Vis. at 100° F. | Saybolt sec. 2691 |
| Vis. at 130° F. | do. 860 |
| Vis. at 210° F. | do. 115 |
| Acidity | mg. KOH/g. .01 |
| Chlorine | per cent .025 |
| Carbon res. | Trace |

A composite sample of polymerized propylene prepared by our process was distilled with fire and steam giving fractions with the following properties:

[Charge—17.3 gallons, 35.9° A. P. I.]

| Cut No. | Vol. per cent | A. P. I. gravity | Vis. 210° Saybolt |
|---|---|---|---|
| 1 | 2.9 | 49.0 | 31 |
| 2 | 5.8 | 44.6 | 33 |
| 3 | 8.7 | 42.0 | 35 |
| 4 | 11.6 | 40.5 | 38 |
| 5 | 14.5 | 39.8 | 40 |
| 6 | 20.3 | 38.7 | 45 |
| 7 | 26.3 | 37.9 | 50 |
| 8 | 32.1 | 37.2 | 57 |
| 9 | 37.9 | 36.4 | 66 |
| 10 | 40.7 | 36.5 | 77 |
| Bottoms | 56.9 | | 233 |

These data illustrate the relatively narrow molecular weight range of the oil produced by our process, using viscosity as a measure of molecular weight.

The effect of charging rate on extent of polymerization and yield of product per pound of aluminum chloride is shown graphically in Figure 3. The data were obtained when charging the pilot plant reactor with a $C_3$ fraction containing about 20 to 25 per cent propylene, the reactor being charged with a fluid $AlCl_3$ catalyst containing the equivalent of two pounds of anhydrous aluminum chloride. It will be noted that the highest conversion or clean-up occurred with the lowest charging rate, i. e. 4 gallons per hour, although the curve for that run shows an unexplained decreasing catalyst efficiency at the beginning of the run. It is significant that charging rate affects catalyst life, the catalyst life above 75 per cent conversion decreasing from about 20 gallons per pound at 4 gallons per hour charging rate to about 11 gallons per pound (9.1 lbs. $AlCl_3$ per 100 gal.) at 12 gallons per hour charging rate.

For comparison, the results obtained with a $C_4$ fraction of cracking still gases containing about 34 per cent of butylenes are shown in Figure 3. It will be noted that the extent of butylene conversion and the catalyst life are both very much lower than in the case of propylene. However, by our process the yield of butylene polymer per pound of aluminum chloride is higher than yields obtained by the prior art methods.

A sample of the propylene polymer was tested for thermal stability by distillation at atmospheric pressure. At 613° F. the first drop of distillate was obtained. The first condensable gases were formed at 716° F. together with some uncondensable gases. The maximum temperature reached was 810° F. From 312 grams of oil charged to the flask there was obtained 8 grams of residue, 291 grams of liquid distillate, 6.3 grams of condensable gases, and 1.5 grams of uncondensable gases (molecular weight 26). Redistillation of the liquid product gave 28.4 per cent of a light distillate boiling below 400° F. The following table is a summary of these results in percentage based on the oil distilled:

| | Percent |
|---|---|
| Residue at 800° F. | 2.6 |
| Gasoline, 400° F. end point | 20.6 |
| Condensable gas | 2.1 |
| Dry gas | 0.4 |
| Heavy polymer recovered | 74.3 |

A sample of butylene polymer prepared by our process was similarly distilled until the bottoms reached 665° F. at which point only a slight amount of cracking occurred.

These results show that polymers obtained by our process are unusually heat stable and quite unlike polymers obtained by other aluminum chloride processes and particularly low temperature processes operating at −10° C. or below. Thus the polymers of isobutylene made at low temperature decompose to a large extent at temperatures as low as 550° F.

As previously indicated, polymerization temperature has a surprisingly small effect on the viscosity and molecular weight of the propylene polymer made by our process as the following data will show:

| Polymerization temperature | Viscosity 210° F. | V. I. | Gravity A. P. I. | Mol. wt. |
|---|---|---|---|---|
| 85° F.: | | | | |
| Total polymer | 65.1 | 59 | 37.6 | 515 |
| 79.5% bottoms | 120 | | 35.2 | 615 |
| 62.5% bottoms | 186 | | | 705 |
| 115° F.: | | | | |
| Total polymer | 55.6 | | 37.5 | 435 |
| 81.3% bottoms | 91.0 | | 35.8 | 525 |
| 57% bottoms | 141 | | 34.8 | 620 |
| 155° F.: | | | | |
| Total polymer | 42.3 | | 39.5 | 390 |
| 76.5% bottoms | 59.8 | 51 | 36.8 | 440 |
| 52% bottoms | 89.0 | | | 530 |

The data on viscosity are shown graphically in Figure 2.

In our process, we avoid vaporization of the $C_3$ feed in the reactor because of the disturbing effect of vapors on the flow thru the catalyst. When vapors are formed, the time of contact is greatly lessened because of the high buoyancy of gas bubbles in the fluid catalyst. The pressure is therefore maintained sufficiently high to prevent vaporization of the propylene or diluent at the temperature employed in the reaction. Ordinarily a pressure of 150 to 250 pounds per square inch is sufficient although pressures up to 500 pounds per square inch may sometimes be necessary.

The hydrogen chloride activator may be added to the feed stock, to the catalyst, or directly to the reactor either continuously or intermittently. The amount needed is within the range of about .0005 to .01 pound per gallon of propylene in the feed. In general, excellent results can be obtained with .004 pound per gallon.

Although we prefer to use a blend of aluminum chloride and aluminum chloride-olefin polymer complex as the catalyst, we may also use aluminum chloride complexes with other hydrocarbons, especially after activating with HCl. As an example, we may employ a complex which has been used for isomerization of paraffin hydrocarbons such as butane, naphtha, etc. with aluminum chloride. The spent aluminum chloride complex from alkylation and hydrohalogenation reactions may also be employed. The catalyst complex may be formed in situ by charging to the reactor a slurry of powdered aluminum chloride in propylene polymer as already described. As used in this specification and appended claims the term "fluid aluminum chloride catalyst" may be defined as a pumpable liquid which contains $AlCl_3$ in a form substantially non-miscible with liquid paraffins and olefins, said liquid catalyst having a specific gravity compared to water greater than about 1 and comprising $AlCl_3$-hydrocarbon complex in which the $AlCl_3$ is chemically combined, which complex may or may not have dispersed therein free aluminum chloride.

As indicated hereinabove our process may be operated with pure propylene as a feed stock, but the viscosity of the resulting product is too high to permit reasonable settling rate of catalyst to make it commercially feasible and a diluent hydrocarbon should be used. In commercial practice, as hereinafter indicated, gas from thermal or catalytic cracking operations, dehydrogenation, reforming or hydroforming are suitable, preferably after fractionating to separate the $C_3$ fraction and treating to remove sulfur compounds if present. The $C_3$ fraction from such stocks may contain from 10 to 60 per cent propylene, usually about 20 to 30 per cent. Our process is particularly advantageous in converting propylene in low concentration to oils of high molecular weight. Other olefins such as ethylene, the butylenes and amylenes may be present with the propylene but they have been found to produce oils of lower molecular weight and viscosity under the conditions of our operation. Their separation by fractionation from the propylene stock presents no difficult problem, however.

The oils made according to our invention have numerous uses to which they are especially adapted. When used for the lubrication of gas engines, automotive, aviation or Diesel, they are susceptible to oxidation but sludge formation is characteristically absent. They may be stabilized against oxidation by the incorporation of small amounts of antioxidants and various additives well known to the trade. Organic compounds of sulfur and phosphorus are particularly effective.

An aviation oil prepared with a viscosity of 115 Saybolt at 210° F. was stabilized with 1.5 per cent of a phosporus-containing stabilizer prepared in accordance with the method of U. S. Patent No. 2,316,080 issued April 6, 1943. A test on this oil in an aviation engine resulted in a very clean engine with practically no ring sticking.

A Diesel oil made from our propylene polymer was tested for 240 hours on a Diesel engine and gave a very clean engine, the oil remaining cleaner than other Diesel oils commonly used.

Because of their high viscosity and freedom from color our propylene polymer oils may be employed as medicinal white oils, preferably after hydrogenation followed by light acid treatment which removes any residual unsaturation. They may also be chlorinated, preferably to about 45 to 55 per cent chlorine content, to yield white resinous plastic products suitable for varnishes, lacquers, water-proofing fabrics, etc. When mixed with graphite a composition is obtained which is particularly suitable for the lubrication of machinery operating at high temperatures such as oven machinery. For the lubrication of threaded pipe joints and plug threads in pipe stills and other high temperature apparatus, the freedom of the oil from sludging results in the clean decomposition of the oil at high temperature without the formation of adhesive deposits. Our oils may also be used in compounding greases of various types where soaps such as the stearates, oleates and palmitates of sodium, calcium, aluminum, etc., are incorporated in the oil to give the desired grease body.

We claim:

1. The process of making synthetic lubricating oil of high thermal stability by polymerizing propylene contained in a liquid propylene-containing hydrocarbon stream which comprises continuously injecting said liquid propylene-containing stream at a low point in a vertically elongated reaction zone below a column at least three feet in height of a fluid aluminum chloride catalyst dispersed in a hydrocarbon oil, maintaining sufficient pressure on said reaction zone to substantially prevent vaporization therein, maintaining the temperature of said catalyst within the range of about 30 to 200° F. by indirect cooling to remove heat of polymerization, charging said hydrocarbon stream at a rate sufficient to supply about 2 to 50 pounds of propylene per hour per pound of aluminum chloride in said reaction zone, adding fresh aluminum chloride to said reaction zone at the rate of about 5 to 10 pounds per 100 gallons of polymer oil produced, separating liquid polymerization products from the major portion of the catalyst within said reaction zone, withdrawing reaction products from the top of said reaction zone together with a small portion of entrained aluminum chloride catalyst segregated within said reaction zone and more nearly spent than the major portion of the catalyst within said reaction zone, separating and discarding said entrained catalyst from reaction products and fractionating said reaction products to recover the desired lubricating oil products.

2. The process of claim 1 wherein said catalyst is activated by the addition of hydrogen chloride.

3. The process of claim 1 wherein the amount of hydrogen chloride promoter is maintained within the range of .0005 to .01 pound per gallon of the propylene feed stock.

DONALD E. BURNEY.
EDMOND L. D'OUVILLE.
CARL MAX HULL.